July 23, 1957 W. LEATHERS ET AL 2,799,994
HYDRAULIC DRIVE AND BRAKING SYSTEM
Filed March 22, 1954
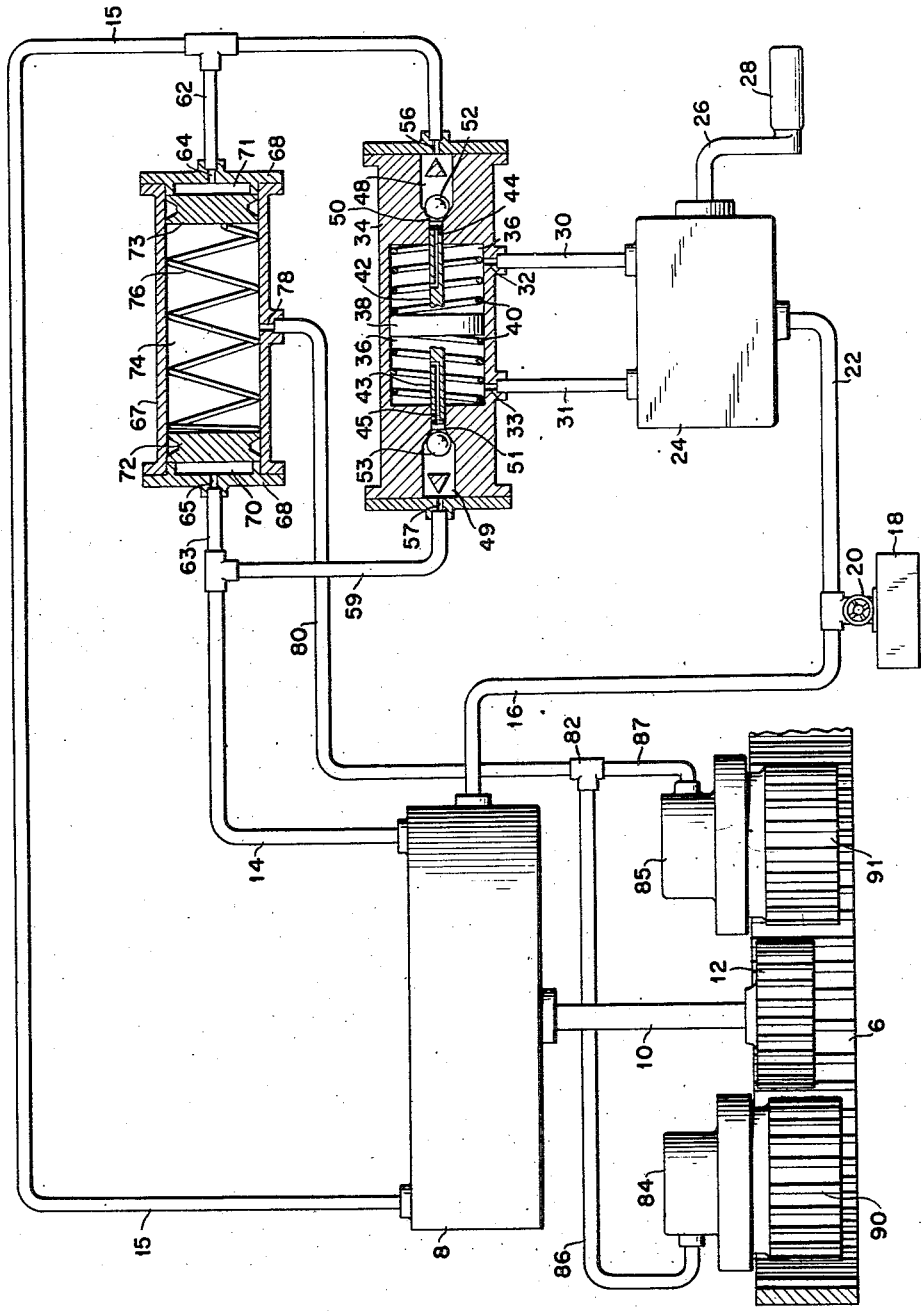
INVENTORS
WARD LEATHERS
BY HUGO A. PANISSIDI
ATTORNEY

United States Patent Office 2,799,994
Patented July 23, 1957

2,799,994

HYDRAULIC DRIVE AND BRAKING SYSTEM

Ward Leathers, Brooklyn, and Hugo A. Panissidi, Binghamton, N. Y., assignors to International Business Machines Corporation, New York, N. Y., a corporation of New York Application March 22, 1954, Serial No. 417,858

7 Claims. (Cl. 60—53)

This invention deals with a hydraulic travel lock device for use on gun turrets, or the like, where a heavy object is rotatably carried on a moving vehicle such that the heavy object may be subject to large inertial forces.

More specifically, this invention makes use of a hydraulic reservoir that is subject to compression forces which are the result of undesired tendencies to relatively rotate a heavy object with respect to the base upon which it is mounted. By employing a hydraulic actuated friction brake and connecting this friction brake for actuation from the hydraulic reservoir that is subject to compression, the brake may be employed to restrain the undesired relative rotation.

Consequently, it is an object of this invention to provide a system whereby the turret of a tank or similar vehicle will be automatically locked to the hull of the vehicle when the vehicle is travelling over rough terrain or making sharp turns. And, by means of such locking, there will be no kick-back effect upon a manual device for rotating the turret.

Another object of this invention is to provide a turret including means employing a direct transmission of power for driving the turret with such transmission including a minimum of inertial effects in connection with such driving power. While at the same time, the ability for the turret to be substantially locked to the hull is maintained, so as to avoid slippage upon the application of undesired torques to the turret due to rough terrain, sharp turns or the like.

Another object of this invention is to provide a system permitting the remote location of a manual turret control. Formerly, the manual controls have been a directly geared connection to a hand crank or the like, and some elaborate provision was necessary to avoid a kick-back from the turret to the hand crank if the crank was to be used when the tank or vehicle was in motion. Also the location was limited by the direct mechanical connection. With our invention, a hydraulic manual control may be used which allows any desired location for the manual control element.

The figure of the drawings illustrates, partly in cross section, the complete system of our invention.

The system of this invention may find various applications but will be described in connection with its use for a system employed to drive the turret of a tank or similar vehicle about a more or less vertical axis. The system includes an internal ring gear 6 that is integrally attached to the hull of the tank, or vehicle (not shown) upon which the travel lock system of our invention is mounted. Carried by the turret (not shown) is a hydraulic motor 8 that has an output shaft 10 which carries securely fastened to the outer end thereof a gear 12 meshing with the internal ring gear 6 for producing rotation of the ring gear 6 relative to the turret upon which motor 8 is mounted. It will be understood, of course, that the parts attached to the hull and to the turret may be reversed if desired since the object is to obtain relative rotation between these two elements.

The hydraulic motor 8 has two fluid circulation pipes 14 and 15 which carry the hydraulic fluid that may be circulated to cause the motor 8 to rotate in either direction. Also connected to the hydraulic motor 8 is a pipe 16 which carries hydraulic fluid under system pressure to reduce any hydraulic backlash to a minimum. There is an accumulator 18 to which the pipe 16 is connected by means of a coupling including a manual shut-off valve 20. This accumulator 18 is a standard element of this type of hydraulic system and operates to maintain a predetermined pressure on the system as well as maintaining a reserve supply of hydraulic fluid. There is another hydraulic pipe 22 that connects with hydraulic pipe 16 and also the accumulator 18 and leads to a manually operated pump 24. Pump 24 is manually actuated by means of any convenient input device such as a crank 26 having a handle 28 thereon. The pump 24 acts to circulate hydraulic fluid in one direction or the other through two hydraulic circuits that lead from the pump 24 to the motor 8. These circuits may be traced beginning at the output ports of pump 24 which have hydraulic pipes 30 and 31 attached thereto. These hydraulic circuits continue from the hydraulic pipes 30 and 31 to a pair of ports 32 and 33 located in a so-called no-back valve unit 34. This no-back valve unit 34 acts to allow fluid to flow in either direction, only when the circulation pressure is initiated at the manual pump 24, not when reverse circulation is initiated by motor 8 acting as a pump. The no-back unit has a cylindrical chamber 36 that contains a piston 38 therein. Piston 38 is spring biased to a central location within chamber 36 by means of a pair of springs 40. Attached to either side of the piston 38 is a pair of piston rods 42 and 43. Located in the piston rods 42 and 43 are passages or grooves 44 and 45 which allow free passage of hydraulic fluid past the piston rods 42 and 43 from the chamber 36 into a pair of chambers 48 and 49 containing ball check valves 52 and 53. The ball check valves 52 and 53 have free passage hydraulic connections via a pair of ports 56 and 57 to connecting hydraulic pipes 58 and 59. The two hydraulic fluid circuits may then be traced from hydraulic pipes 58 and 59 via T couplings as illustrated to the hydraulic pipes 15 and 14, respectively, which lead to the hydraulic motor 8 for reversibly actuating this motor.

Connected to the hydraulic pipes 14 and 15 as well as to pipes 59 and 58 by means of T couplings illustrated, there is a pair of hydraulic pipes 62 and 63 that lead to ports 64 and 65 in the two ends of a compressible reservoir device 66. This reservoir may take many different forms including that illustrated which consists of a cylindrical shell 67 having end plates 68 fastened in a fluid tight manner to the ends of the shell 67. There are chambers 70 and 71 formed at either end of the shell 67 by reason of the configuration of end plates 68. Located within the cylindrical shell 67 and longitudinally movable therein there are two fluid actuated floating pistons 72 and 73 which are spring biased to the ends of a chamber 74 by means of a spring 76. The chamber 74 is filled with hydraulic fluid of an independent hydraulic system which includes a port 78 centrally located in the side of the shell 67, and a connecting hydraulic pipe 80 that leads to a T coupling 82 which connects to a pair of hydraulically actuated friction brake units 84 and 85 simultaneously by means of the additional hydraulic pipes 86 and 87. These brake units 84 and 85 may be any feasible type of hydraulic brake and are preferably a disc type brake such as is used on aircraft wheels. The casing of the brake units 84 and 85 is secured to the same portion of the vehicle as is the hydraulic motor 8, i. e. to the turret, while a pair of gears 90 and 91 that are rotatably secured to the brake units 84 and 85, respectively, are in mesh with the ring gear 6 on the hull or body of the vehicle. The brake units 84 and 85 act in the expected friction brake manner to restrain the rotation of gears 90 and 91 when the units 84 and 85 are actuated by a hydraulic pressure as transmitted via pipes 86 and 87.

Operation

When the tank or vehicle, upon which this system is mounted, is either in motion or standing still, the turret and gun carried thereon may be rotated by means of the operation of manual pump 24 which circulates hydraulic fluid through the hydraulic motor 8 causing it to rotate in one direction or the other, thereby causing rotation of the turret and all elements carried thereon.

It is to be noted that the location of manual pump 24 is not restricted by any mechanical necessities other than the hydraulic pipes 30, 31 and 22 which are connected thereto. For this reason, the manual pump 24 may be located wherever convenient within the turret or even within the hull of the vehicle by using a swivel hydraulic connection.

When the handle 28 of the manual pump 24 is rotated in one direction or the other, hydraulic fluid is circulated in either direction through the hydraulic pipes 30 and 31. This circulation continues via ports 32 and 33 into the chamber 36 on either side of the piston 38. From the chamber 36, the fluid circulation may continue via the passages or grooves 44 and 45 to the ball check valves 52 and 53. As the fluid is circulated from the pump 24 to either of the ball check valves 52 or 53 it unseats the check valve that is located in the path of the circulation being produced. The other check valve at this point would appear to cut off any return circulation of fluid, but the action of the no-back valve unit 34 is such that this other check valve will also be unseated in order to allow free circulation of the fluid in the return direction. Such action is obtained in the following manner: When the fluid pressure is increased by reason of the pumping action initiated at manual pump 24, this pressure increase will be felt in chamber 36 on one side or the other of piston 38. When this pressure increase is created the corresponding ball check valve 52 or 53 will be unseated while at the same time the piston 38 will be displaced within the chamber 36 and against the pressure of one of the springs 40. This displacement of piston 38 will correspondingly displace the attached piston rods 42 and 43 so that a piston rod on the opposite side from that check valve which was unseated by the increase in fluid pressure, will unseat the other check valve also. It will now be clear that whichever direction the pump 24 is actuated, fluid may freely circulate out from the pump 24 through either hydraulic circuit including pipes 31, 59 and 14, or pipes 30, 58 and 15, and at the same time return through the opposite one of these hydraulic circuits. It will be noted, however, that should the hydraulic motor 8 be driven from its output shaft 10 instead of driving the same (as might be the case when the tank makes sudden turns or as it is travelling in rough terrain and is tilted so that the weight of the gun tends to swing the turret) hydraulic fluid would be circulated in reverse, i. e., the circulation would be initiated at the motor 8 and tend to circulate back to the manual pump 24. Such reverse circulation would be effectively cut off by means of either check valve 52 or 53 depending upon the direction of such circulation.

The action of the manual pump 24 and hydraulic motor 8 in connection with the no-back valve unit 34 is as explained above, and will stop any reverse circulation of hydraulic fluid caused by an over-riding action such that the motor 8 is caused to act as a hydraulic pump. Therefore, the no-back valve unit would be sufficient to obviate any kick-back or tendency for the hydraulic motor 8 to drive the manual pump 24 (causing inconvenience and even danger to the operator of the manual pump 24). However, the turret and gun combined, on any such vehicle, are of a sufficient weight that the inertial forces involved become very great in magnitude. In fact, such inertial forces might easily build up hydraulic pressures such that the hydraulic system could be ruptured causing a complete break down. In order to overcome this situation, there is added to the system the compressible reservoir device 66 which acts to add braking force to the turret in restraint of its rotation. This is accomplished by means of the brake units 84 and 85 which are secured to the turret and which act to apply frictional braking forces to the gears 90 and 91 that are associated with each of the brake units 84 and 85. There is a separate hydraulic system for the brake units 84 and 85 that includes hydraulic pipes 86, 87 and 80 as well as the central chamber 74 of the compressible reservoir device 66. The action of this device will be clear upon the inspection of the drawings and may be reviewed as follows: When the hydraulic fluid pressure in the manual pump 24, hydraulic motor 8 system exceeds a predetermined magnitude as determined by the force of the spring 76, either piston 72 or piston 73, depending upon which side of the system has the pressure build up, will be displaced away from the end position illustrated toward the center thereof. Such displacement of one of these pistons 72 or 73 will compress the hydraulic fluid in the separate brake system and this compression will be transmitted from chamber 74 via port 78, hydraulic pipe 80, T-coupling 82 and hydraulic pipes 86 and 87, to the brake units 84 and 85. The brake units 84 and 85 will then be actuated in the ordinary manner so as to apply frictional drag in restraint of rotation of the gears 90 and 91. Such restraint of the rotation of gears 90 and 91 will, of course, create a frictional drag on the rotation of the turret relative to the hull or body of the vehicle so that the inertial forces which originally caused the motor 8 to be driven as a pump, and thereby to increase the hydraulic pressure in the system, will be restrained by the braking action just described and no damage will be created in the system including hydraulic motor 8.

There may be included in the hydraulic line that includes pipe 80 a check valve (not shown) having a predetermined rate bleed passage, in order to cause the brake units 84 and 85 to hold themselves engaged for a short period after each actuation thereof. This arrangement may be added if the system shows a tendency to chatter.

It will be evident that the system of our invention provides a simple and effective means for obtaining a travel lock arrangement on a hydraulic turret drive which will eliminate the necessity for manually locking the turret into a given position before the tank or vehicle is set in motion over rough terrain, or even on level ground where sharp turns are contemplated.

It is to be understood that while we have disclosed one specific embodiment of our invention in detail in accordance with the patent statutes, we do not desire to be limited in any way by this disclosure as it is merely to be taken in an illustrative sense and not as limiting our invention.

We claim:

1. In combination a hydraulic motor for determining the relative position of two elements, a source of forced fluid circulation for actuating said motor, a hydraulically actuated brake for restraining relative motion between said two elements, a hydraulic cylinder having a piston therein for compressing the fluid in said cylinder, a hydraulic connection from said cylinder to said brake, means for applying a force to said piston, a hydraulic connection from said motor to said force applying means, and means sensitive to a change in the source of fluid circulation from said first-named source to said motor when being driven by relative motion between said two elements for checking such changed circulation so that when said motor is driven from its output side and acts as a pump said force applying means will tend to move said piston to compress the fluid and actuate the brake.

2. In combination a hydraulic motor for determining the relative position of two elements, a source of forced fluid circulation for actuating said motor, a hydraulically actuated brake for restraining relative motion between said elements, a hydraulic cylinder having a piston therein for compressing the fluid in said cylinder, a hydraulic connection from said cylinder to said brake, bias means for maintaining said piston in an extreme position in said cylinder, a fluid chamber adjacent one face of said piston for receiving fluid to apply force for moving the piston against said bias, a hydraulic connection from said motor to said fluid chamber, and means sensitive to a change in the source of fluid circulation from said first-named source to said motor when being driven by relative motion between said two elements for checking such changed circulation so that when said motor is driven from its output side and acts as a pump to produce a compression force greater than the bias, the brake will be actuated.

3. In combination a reversible hydraulic motor having two hydraulic lines for reversibly introducing hydraulic fluid flow thereto, a pair of elements the relative position of which is determined by said motor, a hydraulically actuated brake for restraining relative motion between said elements, a hydraulic cylinder having a pair of pistons therein, spring means for biasing said pistons to the extreme ends of said cylinder, a centrally located passage into said cylinder, means connecting said passage with said brake, a pair of fluid chambers located at the ends of said cylinder, and means connecting said chambers with said two hydraulic lines so that when said motor is driven to act as a pump by force from its output side the pressure thus created will move one of said pistons and hence actuate said brake to prevent undesired relative rotation of said elements.

4. In combination a reversible hydraulic motor having two hydraulic lines for reversibly introducing hydraulic fluid flow thereto, a pair of elements the relative position of which is determined by said motor, a hydraulically actuated brake for restraining relative motion between said elements, a manually actuated fluid circulating device for introducing fluid flow to said hydraulic motor, means for restricting hydraulic fluid flow to that flow initiated by the manual circulating device, a hydraulic cylinder having a pair of pistons therein, springs means for biasing said pistons to the extreme ends of said cylinder, a centrally located passage into said cylinder, means connecting said passage with said brake, a pair of fluid chambers located at the ends of said cylinder, and means connecting said chambers with said two hydraulic lines so that when said motor is driven to act as a pump by force from its output side the pressure thus created will move one of said pistons and hence actuate said brake to prevent undesired relative rotation of said elements.

5. In a system having a driven element the inertia of which is great, arresting means comprising in combination a fluid operated brake for applying a desired arresting force to said driven element, a fluid motor for driving said element, said motor having a fluid input connection and a fluid exhaust connection and being under control of a fluid pressure developing and circulating device, means for preventing circulation of fluid between said motor and said device whenever said fluid motor is driven by said element instead of by said fluid pressure device, and means responsive to pressure in said fluid exhaust connection for controlling the application of fluid pressure to said brake to actuate the same, said pressure responsive means being in open fluid communication with said fluid exhaust connection from said fluid motor, said pressure responsive means being actuated when power from said element is transmitted through said motor causing it to act as a fluid pump.

6. In a system having a driven element the inertia of which is great, arresting means comprising a hydraulic brake for applying desired arresting force to said driven element, a hydraulic motor for driving said element, said motor having a fluid input connection and a fluid exhaust connection and being under control of a hydraulic pump, a hydraulic reservoir having at least two compartments therein separated by a pressure transmitting wall, one compartment being in open fluid connection with said brake for controlling the actuation thereof and the other compartment being in open fluid connection with said motor exhaust connection, and means for preventing circulation of fluid between said motor and said pump whenever said motor is overdriven by said element whereby an increase in pressure in said exhaust connection will transmit pressure to said brake to actuate same.

7. In a system having a driven element the inertia of which is great, arresting means comprising a fluid operated brake for applying a desired arresting force to said driven element, a fluid driven motor for driving said element, said motor having fluid circulation conduits connected thereto, said conduits being connected to a fluid pressure developing and circulating device for controlling actuation of said motor, excess pressure responsive means connected to said fluid circulation conduits including means for controlling the application of fluid pressure to said brake to actuate the same, and means for preventing circulation of fluid through said conduits whenever said motor is being overdriven by said driven element so that excess pressure will tend to build up in one of said conduits and said brake will be actuated.

References Cited in the file of this patent

UNITED STATES PATENTS

| | | |
|---|---|---|
| 2,365,126 | Vickers et al. | Dec. 12, 1944 |
| 2,400,587 | Livers | May 21, 1946 |
| 2,480,651 | Hawkins et al. | Aug. 30, 1949 |
| 2,489,411 | Harrington | Nov. 29, 1949 |
| 2,528,645 | Edwards | Nov. 7, 1950 |